United States Patent [19]

Stemmildt et al.

[11] Patent Number: 4,610,058
[45] Date of Patent: Sep. 9, 1986

[54] CENTRAL LOCK FOR SAFETY BELTS

[75] Inventors: Hans-Joachim Stemmildt; Hubert Nöhren, both of Hamburg, Fed. Rep. of Germany

[73] Assignee: Autoflug GmbH, Rellingen, Fed. Rep. of Germany

[21] Appl. No.: 735,383

[22] Filed: May 17, 1985

[30] Foreign Application Priority Data

May 17, 1984 [DE] Fed. Rep. of Germany ....... 3418265
Feb. 23, 1985 [DE] Fed. Rep. of Germany ....... 3506454

[51] Int. Cl.⁴ ............................................ A44B 11/25
[52] U.S. Cl. ........................................ 24/574; 24/584; 24/631; 24/643
[58] Field of Search ................. 24/631, 635, 637, 641, 24/643, 574, 584, 578

[56] References Cited

U.S. PATENT DOCUMENTS

| | | | |
|---|---|---|---|
| 2,391,204 | 12/1945 | Turner et al. | 24/574 |
| 2,641,813 | 6/1953 | Loxham | 24/574 |
| 3,617,019 | 11/1971 | Femia | 24/631 |
| 3,703,749 | 11/1972 | Pfabe | 24/574 |
| 4,403,376 | 9/1983 | Palloks | 24/631 |

FOREIGN PATENT DOCUMENTS

| | | | |
|---|---|---|---|
| 447989 | 4/1948 | Canada | 24/631 |
| 640880 | 5/1962 | Canada | 24/631 |
| 1019455 | 1/1953 | France | 24/631 |
| 384284 | 2/1931 | United Kingdom | 24/631 |

*Primary Examiner*—Victor N. Sakran
*Attorney, Agent, or Firm*—Becker & Becker, Inc.

[57] ABSTRACT

A central lock for safety belts. With such a lock, especially in aircraft and sports cars, where the lock has an external bead behind which the connection members can catch, which in the process can freely align themselves in the respective belt-pulling direction, and where the lock also has control elements for fastening the connection members, for holding them securely in place, and for releasing them, with these control elements being operatively coupled with a manually operable rotary member which is disposed over a stud in conjunction with which the various movements in the lock occur, there exists the problem of an expedient arrangement of the many necessary components while at the same time avoiding two great a structural height. To reduce the overall structural size, and to provide as few components as possible, a retention and release element is disposed around the stud, with this element having a part which extends parallel to the central longitudinal axis of the lock. The stud has two ends, each of which is essentially disposed in a plane extending perpendicular to the central longitudinal axis. The control elements, for assuming the important operating positions of the lock, are disposed about the central longitudinal axis of the lock in the vicinity of an annular space defined by the planes of the stud and by the part of the retention and release element.

16 Claims, 8 Drawing Figures

CENTRAL LOCK FOR SAFETY BELTS

BACKGROUND OF THE INVENTION

1. Field of the Invention

The present invention relates to a central lock or buckle for safety belts, especially for use in aircraft and sports cars, for the rapid and at the same time releasable connection of several belts which are provided with connection members and which come together at a central point; the lock has an external bead behind which the connection members can catch, which in the process can freely align themselves in the respective belt-pulling direction; the lock also has control elements for fastening the connection members, for holding them securely in place, and for releasing them, with these control elements being operatively coupled with a manually operable rotary member, preferably a rotary disk, which is disposed over a central or main stud in conjunction with which the various movements in the lock occur.

2. Description of the Prior Art

Central locks having similar features are disclosed in German Auslegeschrift No. 12 75 875, and U.S. Pat. No. 4,403,376 Pallocks, issued Sept. 13, 1983 and belonging to the Assignee of the present application. These heretofore known locks are of the so-called bell lock type, modified forms of which are also disclosed in Great Britain Pat. No. 758 185, and Belgium Pat. No. 498 365. The important feature of these locks is that the belt connection members can be attached not only at one specific location of the lock, as is the case, for example, with the lock disclosed in German Auslegeschrift No. 10 02 632, but rather can, within a certain range on the lock, starting from the middle point thereof, automatically align themselves in the actual pulling direction of the pertaining belt strap, so that there is achieved an improved seating of the overall belt harness taking into consideration the particular body mass of the person wearing the harness.

To fulfill their purpose, and in connection therewith for proper handling, the more recently known central locks have three positions of their operating devices, namely the positions "fasten", "secured", and "release". The most common type of actuation of the central locks, is the manipulation of the operations by turning a rotary disk and exerting a pressure on the lock toward the body of the person. A lock of this type is disclosed in the aforementioned German Auslegeschrift No. 10 02 632, which concerns a construction having four spring-loaded anchor bolts, which are held by a guide cross, and securing disks. However, this lock also has a main stud, which is displaceable at right angles to a base plate and acts upon the guide cross as well as the securing disk. Mounted to the top of the main stud is a circular rotary disk with which the various lock operations can be manipulated. A rotary actuation by means of a rotary disk or other rotary member has also already been proposed for central locks of the bell type, i.e. with a circumferential edge bead for catching hook-shaped connection members at any desired location, and with a lock part which for this purpose is mounted so that it can wobble. Another older proposal has a central lock with appropriate ones of the aforementioned features, and according to which the rotary member is provided with a linearly displaceable device, preferably a push button, which can be operated with finger pressure and which, by means of at least one transfer element, is provided for the temporary release of arrested components which effect the securing of the belt connection members. The finger push button is springloaded counter to the direction in which it is pressed, and again effects a lock position when it returns to its starting position.

Due to their construction, these heretofore known or already proposed central locks are relatively thick, i.e. they have a relatively great structural height. Consequently, these locks stick out from the body of the person wearing the harness, and can thus not only be an obstruction, but can also collide more easily with adjacent objects, so that erroneous operations or injury are not precluded or made impossible and out of the question. Furthermore, some of the heretofore known locks have the drawback of having a large number of components, which not only increases the cost of assembly, but also adversely affects the ability of the lock to function.

An object of the present invention is to provide a central lock for safety belts, with the aforementioned general features, whereby not only the structural height but also the number of components are as low as possible, without thereby adversely affecting the reliability of the lock itself, and its ability to be handled.

BRIEF DESCRIPTION OF THE DRAWINGS

This object, and other objects and advantages of the present invention, will appear more clearly from the following specification in conjunction with the schematic drawings, in which.

SUMMARY OF THE INVENTION

The central lock of the present invention is characterized primarily in that a retention and release element is disposed around the main stud, with this element having a part which extends parallel to the central longitudinal axis of the lock; the main stud has two ends, each of which is essentially disposed in a plane extending perpendicular to the central longitudinal axis of the lock; the control elements, for assuming the important operating positions of the lock, are disposed about the central longitudinal axis in the vicinity of an annular space defined by the planes of the main stud and by the part of the retention and release element.

Specific advantageous embodiments of the present invention will be presented subsequently.

An advantage achieved with the present invention is that in addition to a flat construction and few individual parts for the main functions of the lock, adequate space is provided for additional components to achieve further functions and increased convenience of operation, especially when fastening the belts. Furthermore, a displacement of the central or main stud in the direction toward the body of the person wearing the harness can be avoided since a force exertion of this type would not be a natural action of the hands of the person. Instead, to release the belt connection members, a rotary movement is preferred which results in an axial movement of the main stud away from the body, so that the latter is not stressed.

To fasten the belt harness, i.e. to insert the belt connection members or belt tabs into the central lock, it is possible, in conjunction with the inventive construction, to use not only a push button which in principle has already been proposed, but also the known methods for turning the actuating or control device.

A drawback of the heretofore known locks is that it is not possible to have a separate intentional release of individual belt connection members, because when the lock function "release" is set with the known locks, all of the belt connection members are released from the lock, or it is necessary to execute a two-hand operation, namely the release of the arresting means and the withdrawal of the respective belt connection members.

A further object of the present invention therefore is to improve the already inventively embodied locks in such a way that it is efficiently possible with one hand to intentionally release individual belt connection members, preferably of the two shoulder belt straps or tabs, without eliminating the lock connection with the other belt tabs.

This objective is realized by providing a grip recess on the rotary disk over the connection members provided for the individual release. After the push button which eliminates the arresting action of the lock is pressed, the grip recess permits a directed tilting of the rejection ring, resulting in release of the pertaining belt connection members. Thus, the present invention has the particular advantage that the lock can be operated with one hand.

Description of Preferred Embodiments

Referring now to the drawings in detail, the inventive central lock or buckle has approximately the shape of a flat, circular can with an upper cover portion which is embodied as a rotary disk 10 having radial wings 11. Disposed in the middle of the rotary disk 10 is a pressure pin 12 as a push button which can be pressed in with a finger. The components 10, 11, and 12 are the operating or control elements of the central lock. By appropriate actuation of these elements by the person wearing the harness having the lock, the latter assumes the operating positions "fasten", "secured", and "release".

The lower portion of the approximately can-shaped lock is formed by a tab-holding ring 13, which has a modified bell shape, so that the inventive lock belongs to the class "bell lock". Details of the tabholding ring 13 can be seen from FIGS. 3 and 4. The shape of the tabholding ring 13 primarily forms an annular, upwardly open groove 14, the reinforced or wider outer wall 15 (external bead) of which forms the abutment for the non-illustrated belt connection members or tabs, the hook-shaped ends of which extend into the groove 14 from above and rest against the external bead 15 under tension. Connected to the top of the wall 15 and radially outwardly thereof, is a plate ring 16 which, among other things, serves as a ramp to facilitate the placement and insertion of the belt tabs. The plate ring 16 is provided with an opening 17 to attach the lock or buckle to a non-detachable belt member (not illustrated), so that the lock cannot be lost.

Figure 3:
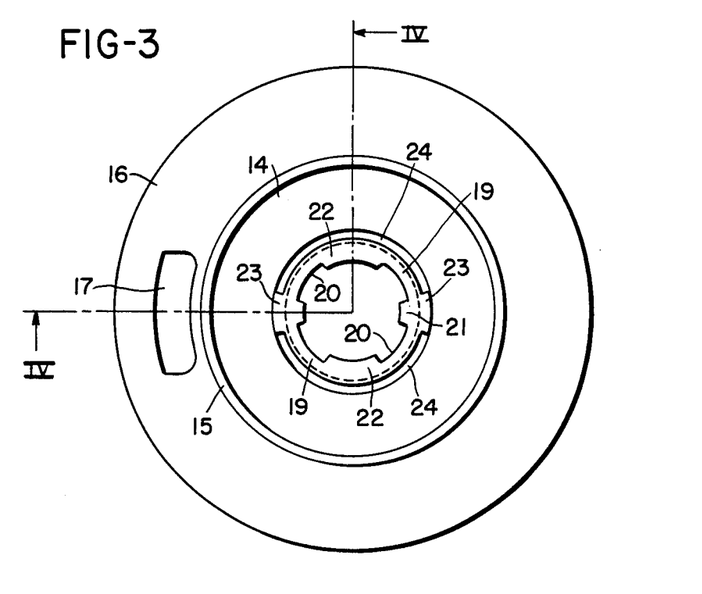
FIG. 3 is a plan view of the tab-holding ring.
Figure 4:
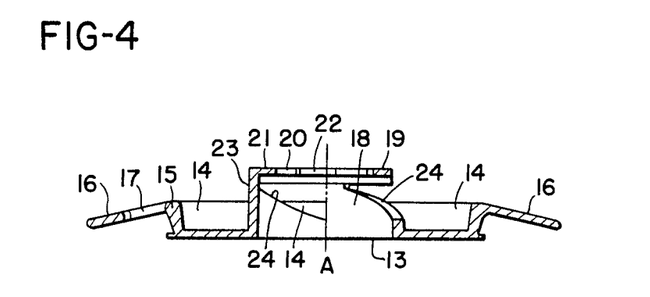
FIG. 4 is a radial cross-sectional view taken at right angles along the line IV—IV in FIG. 3.

The inner wall of the groove 14 of the tabholding ring 13 forms a collar 18 having at the top an inwardly projecting edge 19. As shown in FIG. 3, the inside of the edge 19 alternately projects and is recessed repeatedly, resulting in four recesses 20 and two sets of projections, each set having two projections, with the projections of one set having a different width than those of the other set; in particular, there are two narrow projections 21, and two wider projections 22. The wall of the collar 18 reaches the edge 19 at only two diametrically opposite locations 23 (FIG. 3); in the remaining regions of the circular periphery of the collar 18, the edge 19 forms a sort of freely suspended ring (see the right half of FIG. 4). Below these regions, two upper edges of the wall of the collar 18 each extend as cam surfaces 24, with these surfaces serving as control elements for achieving essential operating positions of the lock.

Figure 5:
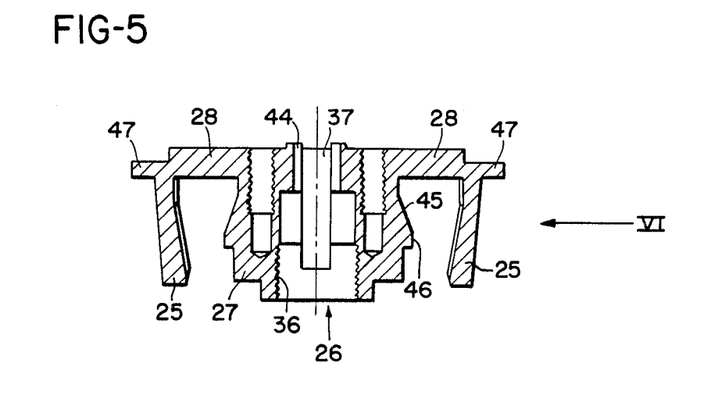
FIG. 5 is a cross-sectional view, taken in the direction of the central longitudinal axis of the lock, through the main stud/cam combination.
Figure 6:
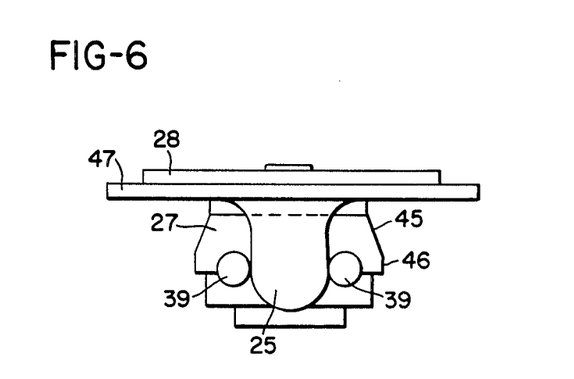
FIG. 6 is a side view taken in the direction of the arrow VI in FIG. 5.

The control elements, which cooperate with the cam surfaces 24 by sliding thereon, are formed by cams 25 disposed on a combination component which is illustrated in FIGS. 5 and 6. This combination component will subsequently be designated as the main stud 26. The stud 26 comprises a multi-stepped sleeve 27, which at the top integrally, especially as a casting, merges into a disk-shaped flange 28; the two cams 25 are formed diametrically opposite one another onto the bottom surface of the flange 28 at a distance from the sleeve 27. The cams 25 are thus disposed in the region between the top and bottom of the main stud 26.

Figure 1:
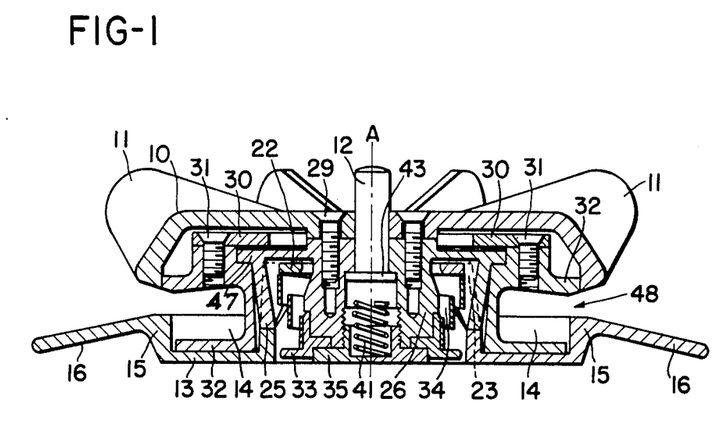
FIG. 1 is a cross-sectional view, taken in the direction of the central longitudinal axis, through one inventive embodiment of a central lock.

As shown in FIG. 1, in conjunction with FIG. 5, the main stud 26 is fixedly connected to the rotary disk 10 by means of two screws 29. Additionally disposed between the rotary disk 10 and the flange 28 is a mounting ring 30, which is secured by means of screws 31 to the top of a retention and release element for the belt tabs (not illustrated) which are to be inserted into the lock and are then to be released. This retention and release element, which will be designated as the rejection ring 32, has an outwardly open U-shaped profile, the inside width of which essentially corresponds to the height of the hook-shaped ends of the tabs, so that the latter can be received in the U-shaped profile. Due to the screws 29 and 31, the rotary disk 10, the main stud 26, the mounting ring 30, and the rejection ring 32 are interconnected, so that they are only movable together in the direction of the central longitudinal axis A of the lock. In the circumferential direction of the nearly can-shaped lock, the rotary disk 10 and the main stud 26 can be moved independently of the mounting ring 30 on the one hand and the rejection ring 32 on the other hand; in other words, the rotary disk 10 and the main stud 26 can be rotated, about the central longitudinal axis A, relative to the mounting ring 30 and the rejection ring 32.

Figure 2:
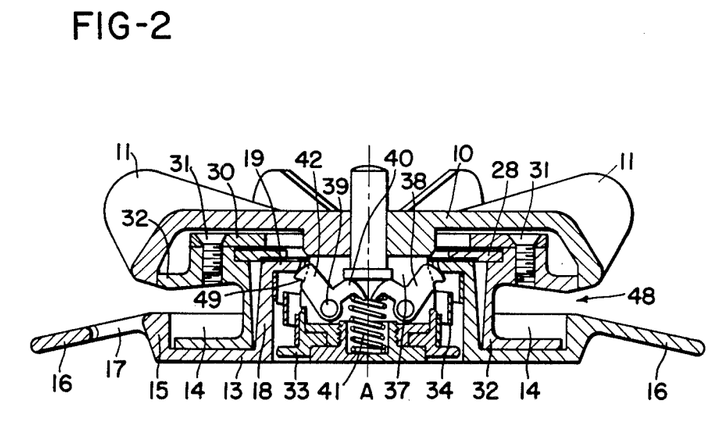
FIG. 2 is a cross-sectional view through the lock of FIG. 1, and is taken at right angles thereto.

The bottom end of the sleeve 27 has a double step for receiving an appropriately shaped spring bearing 33 for a band-like helical compression spring 34, the windings of which extend in the annular intermediate space between the sleeve 27 and the collar 18. As shown in FIGS. 1 and 2, the spring 34 is supported at the bottom on an appropriate annular flange of the spring bearing 33, and is supported at the top against the edge 19 of the collar 18. A spring bearing screw 35 serves to mount the spring bearing 33 onto the sleeve 27 of the main stud 26; this screw 35 is screwed from below into a threaded bore 36 of the sleeve 27 (FIG. 5). Since the flange 28 of the main stud 26 is supported above the edge 19, and the spring bearing screw 35 rests against the edge 19 via the spring bearing 33 and the spring 34, the unity of the parts of the lock are guaranteed in this manner. In this connection, the dimensions of the interior of the collar 18 and of the sleeve 27, along with the spring bearing 33 and the spring bearing screw 35, are such that in the operating position of the lock illustrated in FIGS. 1 and 2, an essentially planar bottom surface results, and the bottom opening of the collar 18 is closed off.

As can be seen from FIGS. 2 and 5, the sleeve 27 of the main stud 26 has a diametrically extending slot 37 in which two angular swivel members 38 on associated pins 39 are symmetrically mounted relative to the central longitudinal axis A. The inwardly directed arm 40 of each of the swivel members 38 has a downwardly directed, hook-shaped projection by means of which it extends over the uppermost winding of a helical compression spring 41, which is disposed in a central bore of the spring bearing screw 35 and acts in the direction of the central longitudinal axis A. As a result, the spring 41 tries to press the inner arms 40 of the swivel members 38 upwardly, so that each of the other arms 42 of the swivel members 38 are caused to pivot outwardly. At the same time, the spring 41 indirectly presses against the pressure pin 12, namely via the arms 40 of the swivel members 38, so as to press the pressure pin 12 upwardly into its starting or rest position (FIGS. 1 and 2). The bottom of the pressure pin 12 is provided with an extension 43 as an abutment for the arms 40. For the longitudinally movable support and guidance of the pressure pin 12 in the main stud 26, the latter is provided in the region of the flange 28 with a bore 44 through which the slot 37 extends (FIG. 5).

As shown in FIG. 2, the length of the outer arms 42 of the swivel members 38 is such that when the spring 41 is in a relieved position, and the swivel members 38 are in an outwardly pivoted position, the arms 42 rest from below, with play, against appropriately rounded-off inner edges of the edges 19 of the collar 18, thus bringing about a situation in which the main stud 26 with the sleeve 27 and flange 28 cannot practically be displaced upwardly in the direction of the central longitudinal axis A relative to the tab-holding ring 13 with the collar 18. Since, as previously described, the rejection ring 32 is connected to the main stud 26, the rejection ring 32 also cannot move when the swivel members 38, in conformity with the position shown in FIG. 2, is pivoted outwardly and rests against the edge 19. This state represents the position "secured".

In the region of the edge 19, the sleeve 27 of the main stud 26 has an outer diameter which is somewhat less than the inner diameter of the edge 19. From there, as shown in FIG. 5, the cross-sectional contour of the sleeve 27 extends via an inclined section 45 outwardly until it achieves the greatest outer diameter of the sleeve 27, where the latter is provided with a short cylindrical section 46. From there, the sleeve 27 is provided with the aforementioned double step for receiving the spring bearing 33. The outer diameter of the cylindrical section 46 corresponds to the inner diameter of the edge 19, so that when this portion of the sleeve 27 enters the inner space of the edge 19, there is provided a linear guidance of the main stud 26 relative to the tab-holding ring 13 with its collar 18, whereas the main stud 26 can be inclined relative to the tab-holding ring 13 as long as the inclined section 45 of the sleeve 27 is still in the region of the edge 19; this describes the ability of the main stud 26 to wobble.

During use, the previously described components of the central lock cooperate as follows: by means of the opening 17 in the plate ring 16, the lock is non-detachably attached to one belt strap in the vicinity of the center of the body of the person who is to be strapped in. The plate ring 16 also serves for stabilizing the position of the lock because due to the wide support surface provided by the plate ring, it is very difficult for the latter to tip on the body or on the clothes. In FIGS. 1 and 2, the lock is in the position "secured", in which the components are securely arrested or locked in position. The rejection ring 32 rests in the groove 14 of the tab-holding ring 13 and cannot move upwardly out of this groove because the outwardly directed arms 42 of the swivel members 38 abut against the edge 19, so that the main stud 26 cannot move upwardly. The outer edge 47 of the flange 28 securely holds the rejection ring 32 from above. Thus, a so-called crash protection of the lock is also assured.

To fasten the belts, the person grasps the individual belt connection members, also known as tabs, with one hand, places the hook-shaped front ends of these tabs against the ramp-like plate ring 16, and pushes the tabs into the gap 48 between the external bead or outer wall 15 and the outer edge of the rotary disk 10. At the same time, the person presses against the pressure pin 12 with a finger of the other hand, thus moving the pressure pin 12 into the lock. In so doing, by means of the extension 43, the inwardly directed arms 40 of the swivel members 38 are pressed downwardly against the pressure of the spring 41, whereupon the swivel members 38 pivot inwardly about their bearing pins 39, and the outer arms 42 move inwardly away from the edge 19; this eliminates the arresting or locking of the lock. By exerting an upwardly directed force at one location of the outer edge of the rotary disk with one of the belt strap tabs pressed into the gap 48, the rejection ring 32 in the groove 14 can be raised at a given location since the main stud 26, along with the parts attached thereto, are tilted or inclined relative to the central longitudinal axis A, which is also made possible by the fact that the sleeve 27, due to its inclined section 45, has sufficient play in the open space of the edge 19. The return force of the spring 34 must be overcome, i.e. when the pertinent tab is completely within the gap 48 and has thus entered the space surrounded by the U-profile of the rejection ring 32, the latter, along with the parts connected thereto, again snaps into the position shown in FIGS. 1 and 2, and the tab becomes hooked behind the external bead 15. If in this fashion the individual tabs are successively inserted into the lock all the way around, the main stud 26 with the flange 28, the mounting ring 30, the rejection ring 32, and the rotary disk 10, carry out a wobbling movement. After all of the belts have been connected with the central lock in this manner, the person releases the pressure pin 12, whereupon the spring 41 can be relieved and the swivel members 38 can move outwardly, so that the outer arms 42 thereof occupy a position below the edge 19 (FIG. 2); the lock is again arrested and locked.

To achieve the position "release", whereby all of the tabs are to leave the lock together, so that the harness promptly releases the person strapped in, the rotary disk 10 must be manually turned about the central longitudinal axis A either to the right or to the left. In so doing, first the arresting of the swivel members 38 is eliminated, and the rejection ring 32 in the groove 14 is raised parallel to the base of the tab-holding ring 13, so that all of the tabs simultaneously pass the upper edge of the external bead 15 and can leave the lock. In detail, this is accomplished as follows: the rotary disk 10 is turned, for example, in a clockwise direction, whereby the main stud 26 which is securely connected thereto is taken along, while the mounting ring 30, along with the rejection ring 32 which is screwed thereto, are not turned. Although the pressure pin 12 and the swivel members 38 remain unaffected, they turn together with the main stud 26 and the components of the latter. The upper edges of the outer arms 42 of the swivel members 38 leave the edge 19 (see FIG. 3), since at the respective end of the projections 21 of the edge 19 these arms enter the next recess 20 and are now no longer covered by the edge 19. At this point, the arresting of the lock is eliminated. During this process, the cams 25 move upwardly at an incline on the associated cam surfaces 24, and as the rotary disk 10 is rotated further, the main stud 26, along with the parts 28, 30, 32, and 10, are raised, relative to the collar 18, in the direction of the axis A. In so doing, the spring bearing screw 35 and the spring bearing 33 also move inwardly, i.e. upwardly, in the channel encircled by the collar 18; the spring bearing screw 35 and the spring bearing 33 move against the pressure of the spring 34, which rests from below against the edge 19. The lifting movement continues until the spring 34 is blocked. At the same time, the rejection ring 32 has achieved its highest position in the groove 14 of the tab-holding ring 13; this position corresponds to the greatest opening of the gap 48, and the belt tabs can be freely let go. If the person subsequently lets go of the rotary disk 10, the latter springs back into its starting position under the effect of the spring 34, whereby it turns in the opposite direction. The lock then again assumes the position illustrated in FIG. 2.

By turning the rotary disk 10 appropriately far in either direction, a position "fasten" can be achieved with the rotary disk 10 independent of the pressure pin 12.

For this purpose, the angle of rotation has only to be great enough that the arms 42 of the swivel members 38 leave the associated edge projections 21, as a result of which the main stud 26, and the rejection ring 32 connected thereto, are able to wobble. These circumstances furthermore offer the possibility of being able to eliminate the swivel members 38, the pressure pin 12, and the spring 41, resulting in an embodiment which is structurally simpler and which can be manufactured at a lower cost.

In place of the swivel members 38, projections or locking catches, which are not illustrated in the drawing, are then provided; these projections would be formed on the outside of the sleeve 27 of the main stud 26 diametrically opposite one another, and in particular would be provided precisely at that location where in FIG. 2 the outer ends of the arms 42 of the swivel members 38 extend beyond the respective contour of the inclined sections 45 (dashed lines); in this case, the slot 37 is also eliminated. The aforementioned projections or locking catches act during the three important operating positions of the lock as the swivel members 38, although they have the drawback that the fastening convenience provided by the pressure pin 12 is not available.

In conjunction with the operation of the lock, it is important that the cam surfaces 24 (FIG. 4) be approximately V-shaped, i.e. that they form a flat point in the middle at the bottom. This assures that after the belts have been released, the lock springs automatically back into its position "secured", for which purpose the helical compression spring 34 provides the necessary force. The cams 25 slide on the cam surfaces 24 and at the same time rotate the main stud 26, along with the rotary disk 10, relative to the tab-holding ring 13 until the cams 25 reach the deepest part of the cam surfaces 24, where they remain. As mentioned, this can proceed in both directions of rotation. Since the cam surfaces 24 immediately arise adjacent to their deepest location, a slight amount of play must be provided between the outer edges of the arms 42 of the swivel members 38, or the outer edges of the aforementioned locking catches (not illustrated) on the one hand, and the inner edges of the edge 19 on the other hand. This play takes into account the increase of the cam surfaces 24 during the route which the swivel members 38 or the locking catches must cover below the edge 19 before they enter the adjacent recess 20, where they can rise without obstruction.

On the whole, the angle of rotation between the position "secured" and the position "release" is approximately 60°, whereupon the greatest stroke of the main stud 26, and hence of the rejection ring 32, is also achieved. Since on the last part of the stroke or the lifting movement, it is important to carefully center the main stud 26 and the components connected therewith, the edge 19, over as great a range as possible, forms a guidance for the cylindrical part 46 of the sleeve 27, for which reason the projection 22 on the edge 19 is wider than is the projection 21 thereof. Whereas the arms 42 of the swivel members 38 are to be freed as quickly as possible from the edge 19, for which purpose the projection 21 is appropriately narrow, the swivel members 38 can extend over the projection 22 by means of small recesses 49 after, in this angular range, they have already projected up over the plane of the edge 19. In this way, the projection 22 can be wider, resulting in an improved guidance for the main stud 26, which is being raised. The arrangement of the recesses 49 is analogously applicable for a lock having locking catches on the main stud in place of the swivel members 38.

When the lock is embodied with locking catches in place of swivel members, in other words without pressure pin actuation during fastening, it is advisable to provide the cam surfaces 24 with a design which indicates to the person when the moment has been reached in which the lock has passed from the original position "secured" into the required position "fasten". For this purpose, for example, a transverse groove or a short section having an increased slope of the cam surface can be formed in the respective cam surface at that location where the locking catches leave the narrow projections 21 of the edge 19 and enter the respective opening or recess 20. The person, with that hand with which he is operating the lock, can then feel a small jolt or a certain impediment to the rqtary motion, thus signaling him that the position "fasten" has now been achieved. Since the lock has two approximately V-shaped cam surfaces 24, and thus four rising cam surface sections, four transverse grooves or sections of increased slope must be provided in conformity therewith.

Figure 7:
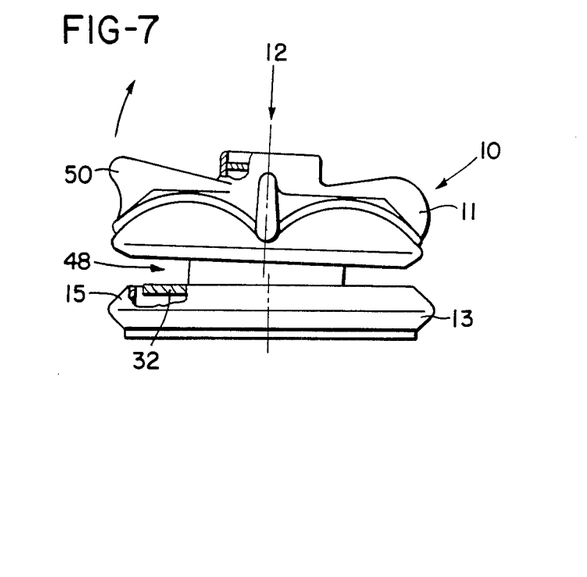
FIG. 7 is a plan view of another embodiment of a so-called bell lock.
Figure 8:
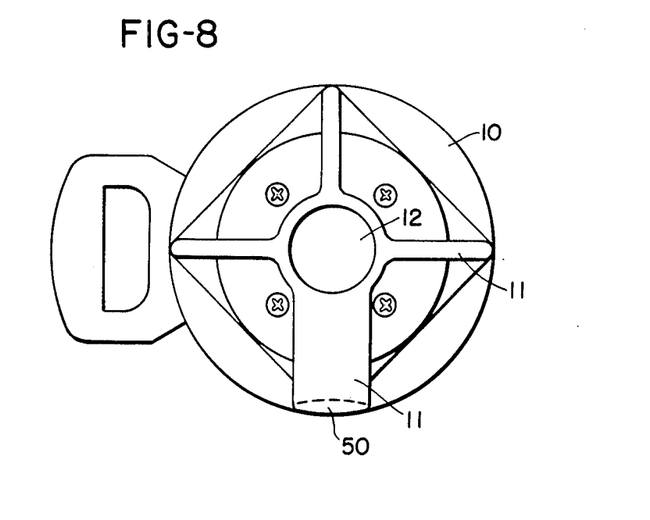
FIG. 8 is a plan view of the bell lock of FIG. 7.

Pursuant to the further inventive embodiment illustrated in FIGS. 7 and 8, there is provided for a belt lock an intentional disconnection and release of the shoulder belt tabs (not illustrated). For this purpose, a grip recess 50 is provided on the rotary disk 10 of the lock above the shoulder belt tabs provided for the separate release.

This lock functions in essentially the same manner as described in connection with the previous embodiment.

Operation of the pressure pin or pushbutton 12 terminates the arresting of the lock, so that the rejection ring 32 can be tilted. Whereas during the insertion of the belt connection members when the pushbutton 12 is pressed in, the tilting of the rejection ring 32 is effected by the pressure of the appropriately shaped belt connection members, the appropriate tilting movement of the rejection ring 32 during the intentional release of the shoulder straps is achieved by raising the grip recess 50, which for this purpose is provided on the rotary disk 10 above the belt connection members which are to be released.

As soon as the user has terminated the arresting of the lock by operating the pushbutton 12, he can, by means of the grip recess 50 disposed above the connection members provided for the release, tilt the rotary disk 10, and hence the rejection ring 32 which is rigidly connected thereto, preferably with the thumb, so that the rejection ring 32 reaches the upper bell edge and has the same level as the latter. Subsequently, the connection members, which are generally subjected to the slight belt tension of a belt reeling-in device, can slide out of the rejection ring 32, and hence out of the arresting of the lock, while the other belt connection members are held securely in place, as before, by the tilted rejection ring 32.

The present invention is, of course, in no way restricted to the specific disclosure of the specification and drawings but also encompasses any modifications within the scope of the appended claims.

What we claim is:

1. A central lock for safety belts, especially for use in aircraft and sports cars, for the rapid and at the same time releasable connection of several belts which are provided with connection members and which come together at a central point; the lock having therewith an external bead behind which the connection members can catch, which in the process can freely align themselves in the respective belt-pulling direction; the lock also having therewith control elements for fastening the connection members, for holding them securely in place, and for releasing them, with these control elements being operatively coupled exclusively with a manually operable rotary member, rotation of which effects actuation of said central lock for safety belts and which is disposed over a central stud in conjunction with which the various movements in the lock occur to bring about three important operating positions including "fasten", "secured", and "release" respectively responsive to a pivot movement of a pivotable lever perpendicular to a base plane with which especially the position "release" brings about simultaneous ejection of all connection members by actuation of said rotary member; the improvement therewith which comprises:
a retention and release element disposed around said central stud, with said element having a part which extends parallel to the central longitudinal axis of said lock; said central stud having two ends, each of which is essentially disposed in a respective plane which extends perpendicular to said central longitudinal axis; said control elements, for assuming the important operating positions of said lock, being disposed about said central longitudinal axis in the vicinity of an annular space defined by said planes of said ends of said central stud, and by said part of said retention and release element.

2. A central lock for safety belts, especially for use in aircraft and sports cars, for the rapid and at the same time releasable connection of several belts which are provided with connection members and which come together at a central point; the lock has an external bead behind which the connection members can catch, which in the process can freely align themselves in the respective belt-pulling direction; the lock also has control elements for fastening the connection members, for holding them securely in place, and for releasing them, with these control elements being operatively coupled with a manually operable rotary member, which is disposed over a central stud in conjunction with which the various movements in the lock occur; the improvement therewith which comprises;
a retention and release element disposed around said central stud, with said element having a part which extends parallel to the central longitudinal axis of said lock; said central stud having two ends, each of which is essentially disposed in a respective plane which extends perpendicular to said central longitudinal axis; said control elements, for assuming the important operating positions of said lock, being disposed about said central longitudinal axis in the vicinity of an annular space defined by said planes of said ends of said central stud, and by said part of said retention and release element; said central stud having a main central portion; said control elements including first control elements for the assumption of an operating position "release", with said first control elements being disposed beyond said main portion of said central stud; and said control elements including second control elements for the assumption of operating positions "fasten" and "secured", with said second control elements essentially being disposed within a space within said main portion of said central stud.

3. A central lock according to claim 2 in which said central stud is fixedly connected with said rotary member.

4. A central lock according to claim 3, in which said retention and release element is tightly connected with said central stud yet is rotatable relative thereto.

5. A central lock according to claim 3, in which said central stud and said retention and release element are in the form of an integral component.

6. A central lock according to claim 3, which includes an annular component in the form of a tabholding ring; the latter is provided radially outwardly with said external bead, and radially inwardly with a collar for receiving said central stud; formed between said external bead and said collar is a groove for receiving said belt connection members.

7. A central lock according to claim 6, in which an essentially radially outwardly extending plate ring is formed on said external bead of said tab-holding ring; said plate ring serves as a ramp for said belt connection members.

8. A central lock according to claim 6, in which said first control elements include cams provided on said central stud radially outwardly of said main portion thereof, and also include cam surfaces on said collar for cooperation with said cams.

9. A central lock according to claim 8, in which that end of said central stud remote from said groove of said tab-holding ring is provided with a flange, with said cams being connected to diametrically opposite locations thereof and extending in the direction of said groove.

10. A central lock according to claim 9, in which each of said cam surfaces of said collar is provided with a transverse groove into which the respective cams enter upon rotation of said central stud, so that upon appropriate rotation, a pressure point can be perceived at said rotary member; in which said collar has an edge remote from said groove of said tab-holding ring, with said edge being provided with recesses; and in which said second control elements are provided with projections; said transverse grooves are located at locations of said cam surface corresponding to a rotated position of said stud relative to said collar, and in which locations said projections can pass through said recesses of said edge of said collar.

11. A central lock according to claim 10, in which said edge of said collar is provided with four recesses and four projecting portions.

12. A central lock according to claim 9, which includes a pressure pin which extends through the middle of said rotary member; in which said collar has an edge remote from said groove of said tab-holding ring; in which said central stud has an axial transverse slot; in which said second control elements are two angular swivel members, each of which has a first arm disposed in the effective range of said pressure pin; which includes a compression spring for urging said first arms into an outwardly pivoted position; and in which each of said swivel members also has a second arm which in said outwardly pivoted position abuts, with some play, said edge of said collar from that side remote from rotary member to thereby preclude lifting movements of said central stud relative to said collar.

13. A central lock according to claim 12, in which, to release individual ones of said belt connection members, respective grip recesses are provided exclusively on said rotary member over the pertaining ones of said connection members, said respective grip recesses, with said pressure pin being pressed, permitting a wobble lifting of said rotary member in essence vertically of a plane of rotation thereof.

14. A central lock according to claim 12, in which said central stud is provided, on that end remote from said flange thereof, with a spring bearing; and in which a further compression spring is disposed between said spring bearing and said edge of said collar; said further compression spring is disposed around said main portion of said central stud, and exerts a force upon the latter, which force is directed in the direction of said central longitudinal axis of said lock toward said tab-holding ring, and presses said retention and release element into said groove of said tab-holding ring.

15. A central lock according to claim 14, in which said central stud is disposed so as to have play in the region of said edge of said collar, so that said stud, along with said flange and said retention and release element, are able to wobble; and in which said central stud, adjacent said region of play thereof, is widened in the manner of a truncated cone and merges into a cylindrical section which corresponds to the radially inner dimension of said edge of said collar, and which brings about a linear guidance of said stud during appropriate lifting of the latter from said collar.

16. A central lock according to claim 2, in which said retention and release element has a radially outwardly open U-profile, the open space of which, as measured in the direction of said central longitudinal axis of said lock, corresponds to the hook dimension of said belt connection members.

* * * * *